(12) United States Patent
Kunda

(10) Patent No.: US 11,072,951 B2
(45) Date of Patent: Jul. 27, 2021

(54) DOOR LATCH ASSEMBLY AND METHOD OF USING A DOOR LATCH ASSEMBLY

(71) Applicant: The Boeing Company, Chicago, IL (US)

(72) Inventor: James J. Kunda, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 627 days.

(21) Appl. No.: 15/950,366

(22) Filed: Apr. 11, 2018

(65) Prior Publication Data

US 2019/0284848 A1 Sep. 19, 2019

Related U.S. Application Data

(60) Provisional application No. 62/643,231, filed on Mar. 15, 2018.

(51) Int. Cl.
| | |
|---|---|
| *E05B 83/00* | (2014.01) |
| *E05C 3/00* | (2006.01) |
| *E05B 77/44* | (2014.01) |
| *E05B 81/08* | (2014.01) |
| *E05B 81/28* | (2014.01) |

(Continued)

(52) U.S. Cl.
CPC ............ *E05B 83/00* (2013.01); *B64C 1/1469* (2013.01); *E05B 77/44* (2013.01); *E05B 81/08* (2013.01); *E05B 81/16* (2013.01); *E05B 81/28* (2013.01); *E05B 85/24* (2013.01); *E05C 3/006* (2013.01);

(Continued)

(58) Field of Classification Search
CPC ............ E05B 47/0047; E05B 47/0004; E05B 47/0607; E05B 47/0696; E05B 81/08; E05B 47/0002; E05B 47/06; E05B 15/0205; E05B 15/021; E05B 47/00; E05B 47/0603; E05B 81/28; E05B 83/00; E05B 77/44; E05B 1/16; E05B 85/24; Y10T 292/696; Y10T 292/68; B64C 1/1469; B64D 45/0029;

(Continued)

(56) References Cited

U.S. PATENT DOCUMENTS 4,986,584 A * 1/1991 Logas ................. E05B 47/0047
292/201
7,032,863 B1 * 4/2006 Piorkowski ........... B64C 1/1469
244/129.4

(Continued)

*Primary Examiner* — Mark A Williams
(74) *Attorney, Agent, or Firm* — Walters & Wasylyna LLC

(57) ABSTRACT

A door latch assembly, includes: a catch support assembly, the catch support assembly including a strike body having a pin receiving aperture therein; a catch arm assembly rotatably mounted to the catch support assembly; a latch pin positioned in the pin receiving aperture and movable between a retracted position and an extended position, the latch pin protruding above the strike body in the extended position to impede rotational movement of the catch arm assembly; and a first roller mounted to the catch arm assembly and configured to engage a first side of the latch pin in the extended position; and a second roller mounted to the catch support assembly and configured to engage a second side of the latch pin in the extended position. The latch pin includes a material having a hardness of 60 Rockwell C or more, the first roller includes a material having a hardness of 33 Rockwell C or less, and the second roller includes a material having a hardness of 60 Rockwell C or more.

20 Claims, 14 Drawing Sheets

(51) Int. Cl.
    *E05B 85/24* (2014.01)
    *B64C 1/14* (2006.01)
    *E05B 81/16* (2014.01)

(52) U.S. Cl.
    CPC ... *E05Y 2201/434* (2013.01); *E05Y 2900/502* (2013.01)

(58) Field of Classification Search
    CPC ......... E05Y 2201/434; E05Y 2900/502; E05C 3/006
    See application file for complete search history.

(56) References Cited

U.S. PATENT DOCUMENTS

| | | | |
|---|---|---|---|
| 7,770,949 B2* | 8/2010 | Kunda | E05C 1/08 |
| | | | 292/341.16 |
| 10,519,695 B2* | 12/2019 | Chang | E05B 81/08 |
| 2004/0046084 A1* | 3/2004 | Brzeski | B64C 1/1469 |
| | | | 244/129.5 |
| 2004/0061343 A1* | 4/2004 | Bashford | E05B 47/0047 |
| | | | 292/341.16 |
| 2004/0094670 A1* | 5/2004 | Pratt | E05B 51/023 |
| | | | 244/129.4 |
| 2011/0031768 A1* | 2/2011 | Scheffler | E05B 15/024 |
| | | | 292/341.16 |
| 2019/0284848 A1* | 9/2019 | Kunda | E05B 85/24 |

* cited by examiner

DOOR LATCH ASSEMBLY AND METHOD OF USING A DOOR LATCH ASSEMBLY

PRIORITY

This application is a non-provisional of, and claims priority from, U.S. Ser. No. 62/643,231 filed on Mar. 15, 2018.

FIELD

The present invention relates in general to the field of door operating mechanisms and more specifically to electronically locking cockpit door operating mechanisms.

BACKGROUND

Effectively controlling access to a flight deck or cockpit of a passenger aircraft helps to control numerous risks associated with unauthorized cockpit entry. Typically, aircraft personnel have controlled access through an electronic locking mechanism disposed on or in the cockpit door and/or door frame/structure. Electronic locking systems typically involve solenoid systems having an electric solenoid, a control switch within the flight deck and a keypad for entering an access code. The solenoid when powered automatically engages to lock the door upon closing the door and retracts upon an authorized crew member requesting entry to the flight deck, and the pilots granting access to the flight deck via the control switch or by entering an access code with the keypad. In common applications, the solenoid is energized to project a pin which prevents unauthorized door opening. The solenoid is de-energized via the control switch or when the access code is entered which retracts the pin and allows the door to be swung open.

While common electronic systems effectively control access, this is balanced against the need to easily open the door for an authorized entry. Common solenoid systems therefore provide a taper at the engagement end of the pin which allows a catch assembly of the door strike mechanism to push the pin out of the way so the door can be opened under a rapid decompression event and with the pin in a partly engaged position. The pin taper, however, can adversely affect the electric door strike assembly's capability to withstand a forced entry.

There is therefore a need to provide an improved mechanism for aircraft cockpit door use which both permits the door to be opened easily for authorized entry yet provides sufficient retention capability to prevent unauthorized entry into the cockpit.

Accordingly, those skilled in the art continue with research and development efforts in the field of door latch assemblies.

SUMMARY

In one embodiment, a door latch assembly, including: a catch support assembly, the catch support assembly including a strike body having a pin receiving aperture therein; a catch arm assembly rotatably mounted to the catch support assembly; a latch pin positioned in the pin receiving aperture and movable between a retracted position and an extended position, the latch pin protruding above the strike body in the extended position to impede rotational movement of the catch arm assembly; and a first roller mounted to the catch arm assembly and configured to engage a first side of the latch pin in the extended position; and a second roller mounted to the catch support assembly and configured to engage a second side of the latch pin in the extended position. The latch pin includes a material having a hardness of 60 Rockwell C or more, the first roller includes a material having a hardness of 33 Rockwell C or less, and the second roller includes a material having a hardness of 60 Rockwell C or more.

In another embodiment, a method of using a door latch assembly includes providing the door latch assembly including: a catch support assembly, the catch support assembly including a strike body having a pin receiving aperture therein; a catch arm assembly rotatably mounted to the catch support assembly; a latch pin positioned in the pin receiving aperture and movable between a retracted position and an extended position, the latch pin protruding above the strike body in the extended position to impede rotational movement of the catch arm assembly; a first roller mounted to the catch arm assembly and configured to engage a first side of the latch pin in the extended position; and a second roller mounted to the catch support assembly and configured to engage a second side of the latch pin in the extended position. The latch pin includes a material having a hardness of 60 Rockwell C or more, the first roller includes a material having a hardness of 33 Rockwell C or less, and the second roller includes a material having a hardness of 60 Rockwell C or more. The method further includes moving the latch pin from the retracted position to the extended position and rotating the catch arm assembly such that the first roller engages a first side of the extended latch pin, wherein the extended latch pin impedes the rotational movement of the catch arm assembly.

Other embodiments of the disclosed door latch assembly will become apparent from the following detailed description, the accompanying drawings and the appended claims.

DETAILED DESCRIPTION

Figure 1:
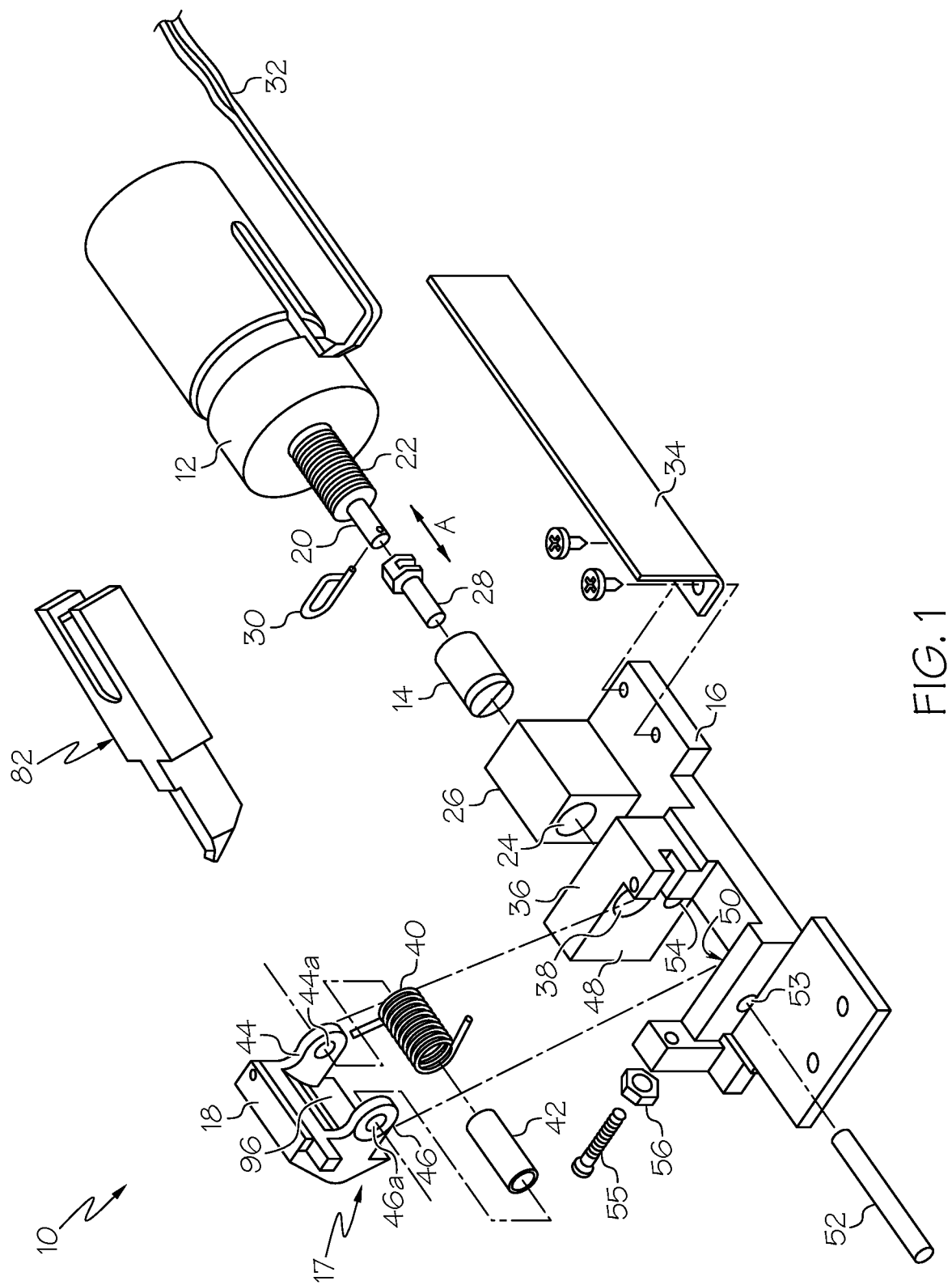
FIG. 1 is an exploded view of a door locking mechanism, including a door latch assembly and a latch bolt, according to an embodiment.

According to an exemplary embodiment of the present invention and referring generally to FIG. 1, a door locking mechanism 10 includes a solenoid 12 which is operable to longitudinally displace a latch pin 14. Latch pin 14 is positioned in slidable engagement with a catch support assembly 16 of the present invention. Solenoid 12 positions latch pin 14 in either of pin displacement direction arrows "A". A catch arm assembly 17 is rotatably mounted to catch support assembly 16. Latch pin 14 is operable to impede rotation of a catch arm 18 of catch arm assembly 17 when latch pin 14 is positioned in an extended position by solenoid 12 in a solenoid energized position of solenoid 12.

Solenoid 12 further includes a solenoid shaft 20 longitudinally displaceable in the direction of pin displacement direction arrows "A". Solenoid shaft 20 is slidably disposed within a threaded portion 22. Threaded portion 22 of solenoid 12 is threadably engaged within a threaded aperture 24 of a solenoid support member 26 of catch support assembly 16. An adjustment element 28 is slidably disposed over solenoid shaft 20 and retained relative to solenoid shaft 20 using a retention clip 30. Adjustment element 28 is externally threaded to receive internal female threads of latch pin 14.

Solenoid 12 is electrically powered and controlled via a wire bundle 32. A mounting bracket 34 is provided to further support either or both of solenoid 12 and wire bundle 32 to catch support assembly 16.

Catch support assembly 16 further includes a strike body 36 which includes a pin receiving aperture 38 sized to slidably receive latch pin 14. Catch arm assembly 17 further includes a torsion spring 40 which is substantially hollow and internally supported by a torsion spring support tube 42 which is positioned between a first extension 44 and a second extension 46 of catch arm 18. First extension 44 of catch arm 18 rotatably abuts a first contact face 48 of strike body 36. Similarly, second extension 46 of catch arm 18 rotatably abuts a second contact face 50 of catch support assembly 16. A centering sleeve 52 is slidably positioned via a centering sleeve receiving aperture 53 within apertures of each of first extension 44 and second extension 46 and through torsion spring support tube 42 to rotatably mount catch arm 18 to catch support assembly 16. A distal end of centering sleeve 52 is slidably received within a centering sleeve retention aperture 54 formed within strike body 36. Catch support assembly 16 further includes an adjustment screw 55 fixed in position using a locking nut 56.

Figure 6:
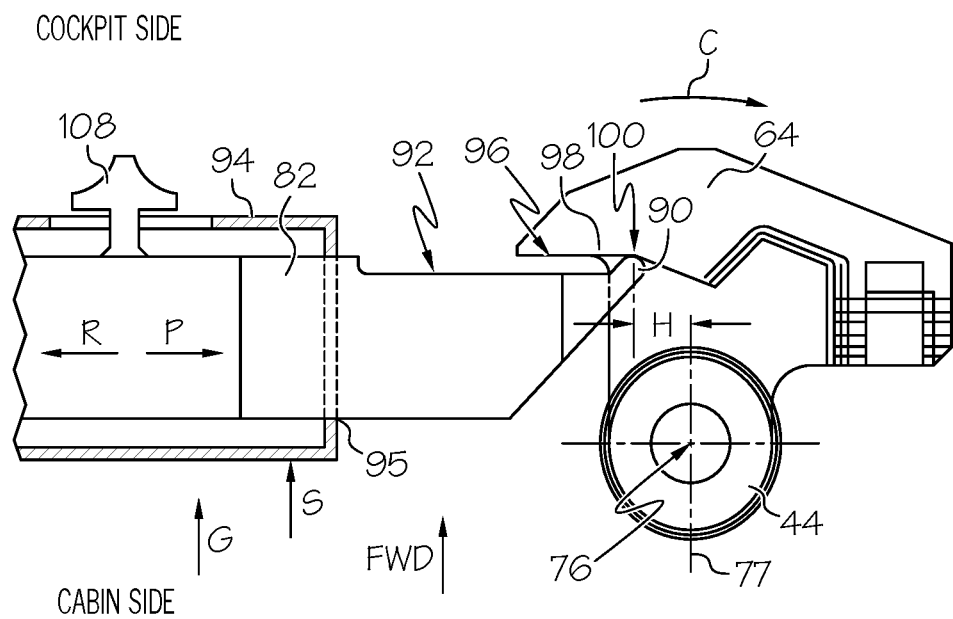
FIG. 6 is a partially sectioned plan view of the latch bolt and a flat faced catch arm in a door closed position.

Door locking mechanism 10 further includes a latch bolt 82 which is slidably connected to a door such as a cockpit door (shown and described in reference to FIG. 6). Latch bolt 82 contacts a flattened catch face 96 of catch arm 18 to normally maintain a door closed position. As will be discussed further herein, sufficient force applied via latch bolt 82 can also rotate catch arm 18 to open the door.

Figure 2:
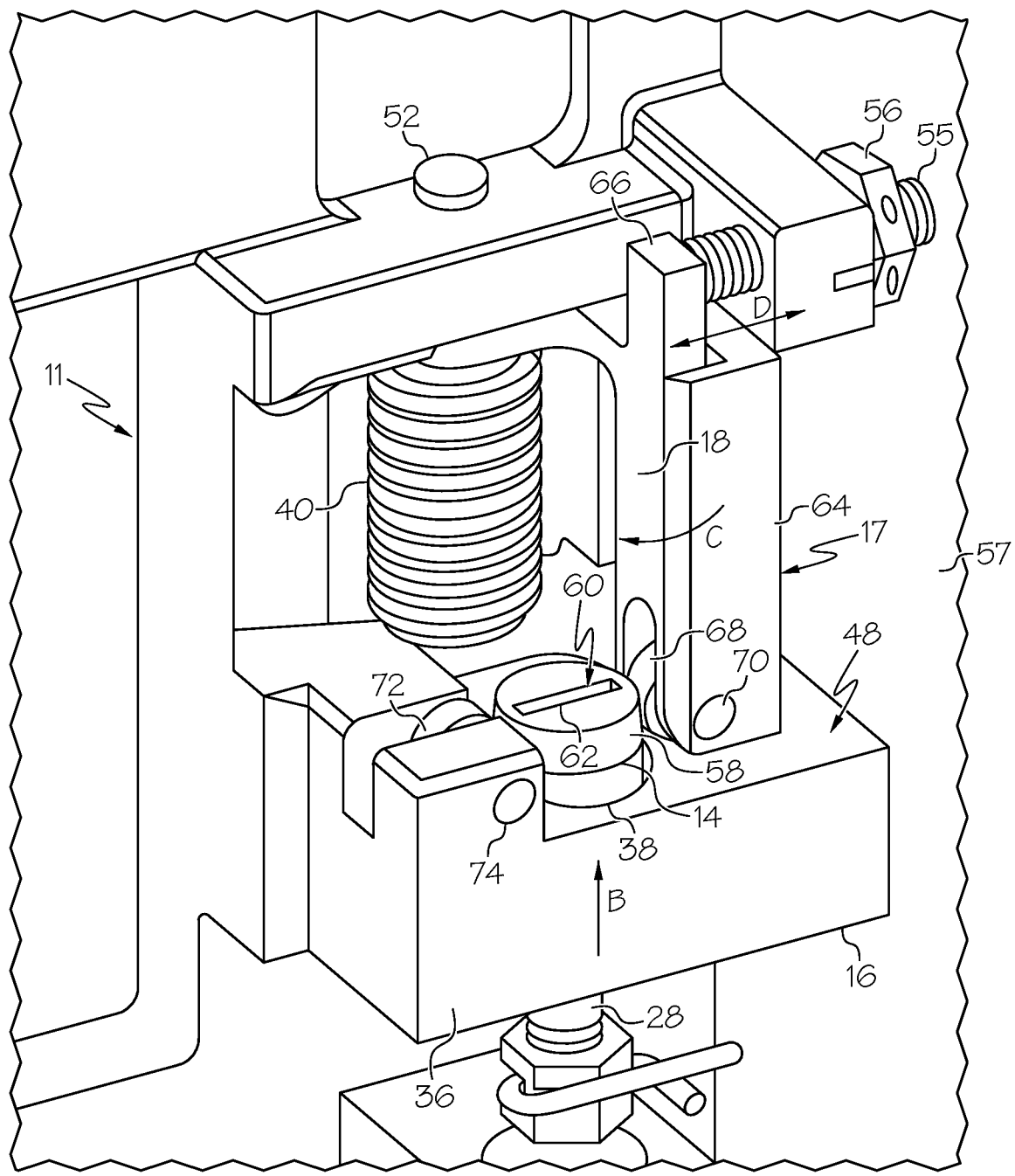
FIG. 2 is a perspective view of a partially assembled door latch assembly of FIG. 1 showing a latch pin in a solenoid energized position.

Referring next to FIG. 2, a portion of door locking mechanism 10 includes a door latch assembly 11. Door latch assembly 11 is connected to a door post/structure 57 and includes latch pin 14, catch support assembly 16 and catch arm assembly 17. Latch pin 14 is shown threaded to adjustment element 28 in the solenoid energized position and fully extended in a pin energized displacement direction "B". Catch support assembly 16 is fastened or otherwise connected to door post/structure 57. In a preferred embodiment of the present invention door locking mechanism 10 is used to provide access and access control to a cockpit of an aircraft. To accomplish this, latch pin 14 is provided with a taper portion 58. In the fully extended or solenoid energized position of latch pin 14, taper portion 58 is completely exposed above first contact face 48 of strike body 36. Latch pin 14 is slidably received within pin receiving aperture 38 such that latch pin 14 is horizontally restrained by the aperture wall of pin receiving aperture 38. A distal end 60 of latch pin 14 includes a slot 62 provided to allow a tool such as a screwdriver to be used to rotate to adjust the position of latch pin 14 using male threads of adjustment element 28.

Catch arm assembly 17 further includes a catch arm member 64 which rotates about a catch arm rotation arc "C" starting at the position shown. Catch arm member 64 is restrained at one end of its rotation path by contact between a stop portion 66 of catch arm member 64 and adjustment screw 55. Adjustment screw 55 is threaded into engagement with stop portion 66 to provide a door closed position of catch arm 18 shown in FIG. 2. Adjustment screw 55 is positionable in either of catch arm adjustment direction arrows "D".

In the solenoid energized position shown in FIG. 2, latch pin 14 in its extended position impedes rotation of catch arm member 64 about catch arm rotation arc "C". Rotation is impeded by contact between taper portion 58 of latch pin 14 and a first roller 68 mounted to catch arm member 64 using a first pin 70. Horizontal displacement of latch pin 14 is further restrained by contact on an opposing side of taper portion 58 between taper portion 58 and a second roller 72. Second roller 72 is mounted to strike body 36 using a second pin 74. The first roller 68 and second roller 72 each rotate about respective first pin 70 and second pin 74.

Figure 12A:
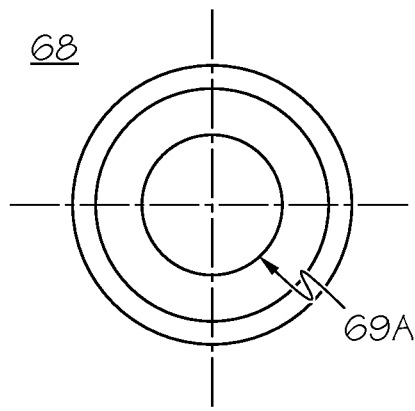
FIGS. 12A and 12B are front and side elevational views, respectively, of an exemplary first roller according to an embodiment.
Figure 12B:
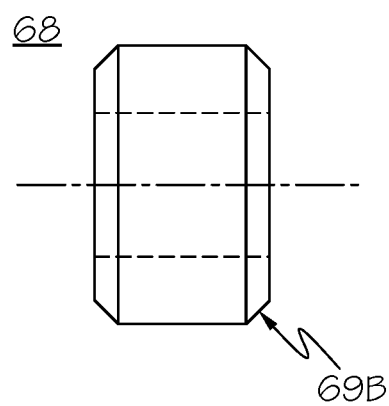
Figure 13A:
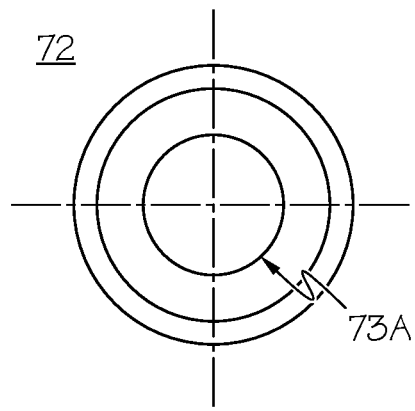
FIGS. 13A and 13B are front and side elevational views, respectively, of an exemplary second roller according to an embodiment.
Figure 13B:
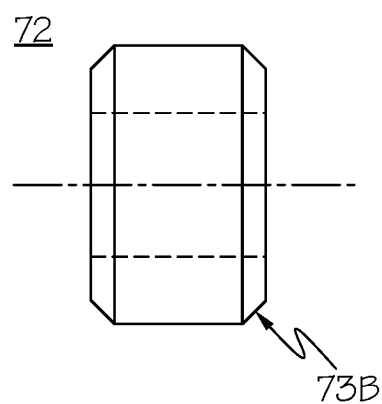

An exemplary first roller 68 is shown in FIGS. 12A and 12B, and an exemplary second roller 72 is shown in FIGS. 13A and 13B. As shown in FIGS. 12A and 12B, the exemplary first roller 68 has a cylindrical overall shape with a central bore 69A for receiving a pin therein and with tapered edges 69B. Likewise, as shown in FIGS. 13A and 13B, the exemplary second roller 72 has a cylindrical overall shape with a central bore 73A for receiving a pin therein and with tapered edges 73B. According to this example, the first roller 68 and the second roller 72 have the same dimensions. In an exemplary aspect, the first roller 68 and the second roller 72 may be sized and positioned such that the top of the latch pin 14, when extended, is below the tops of the first roller 68 and the second roller 72. For example, the top of the latch pin 14, when extended, may be below the tops of the first roller 68 and the second roller 72 by 0.60 to 0.65 in.

Door locking mechanism 10 normally prevents door opening when the latch pin 14 is positioned as shown in FIG. 2 by physical contact with latch pin 14 and the additional rotational force provided by torsion spring 40. It is possible, however, to overcome the torsional force provided by torsion spring 40 as well as to force displacement of latch pin 14 in a direction opposite to pin energized displacement direction "B" by applying a sufficient force in the catch arm rotation arc "C". When sufficient force (defined as a force greater than a human applied force) is supplied in the direction of catch arm rotation arc "C", first roller 68 forces latch pin 14 downward as viewed in FIG. 2 by contact with taper portion 58 sufficient to overcome both the frictional engagement forces of latch pin 14 within pin receiving aperture 38 and the upward directed force provided by solenoid 12. The amount of force required to overcome the position of latch pin 14 shown in FIG. 2 is controlled in part by selectively controlling the amount or degree of taper of taper portion 58.

Figure 3:
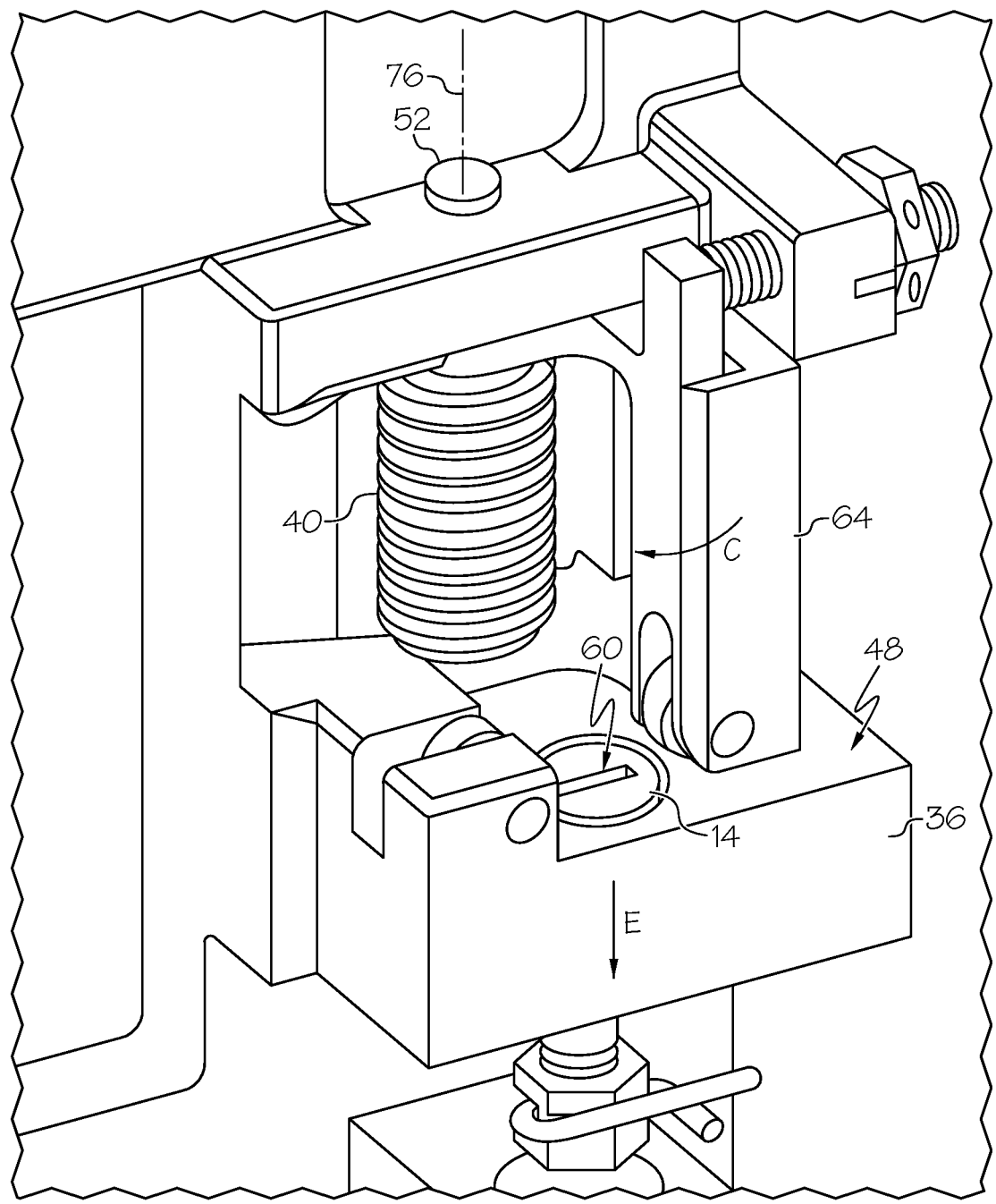
FIG. 3 is a perspective view similar to FIG. 2 showing the latch pin in a solenoid de-energized position.

Referring next to FIG. 3, when solenoid 12 is de-energized, latch pin 14 repositions in a pin de-energized displacement direction "E" to a latch pin de-energized position shown. Latch pin 14 is adjusted relative to adjustment element 28 such that in the de-energized position, distal end 60 of latch pin 14 is substantially co-planar with or below first contact face 48 of strike body 36 as viewed in FIG. 3. In the de-energized position of latch pin 14 shown, catch arm member 64 is therefore free to rotate in the catch arm rotation arc "C" and permit a manual opening of an adjacent door. Catch arm member 64 rotates about a catch arm axis of rotation 76 centrally formed through centering sleeve 52. To reposition catch arm member 64 in the catch arm rotation arc "C", sufficient force is only required to overcome the biasing force provided by torsion spring 40 and any frictional forces.

Figure 4:
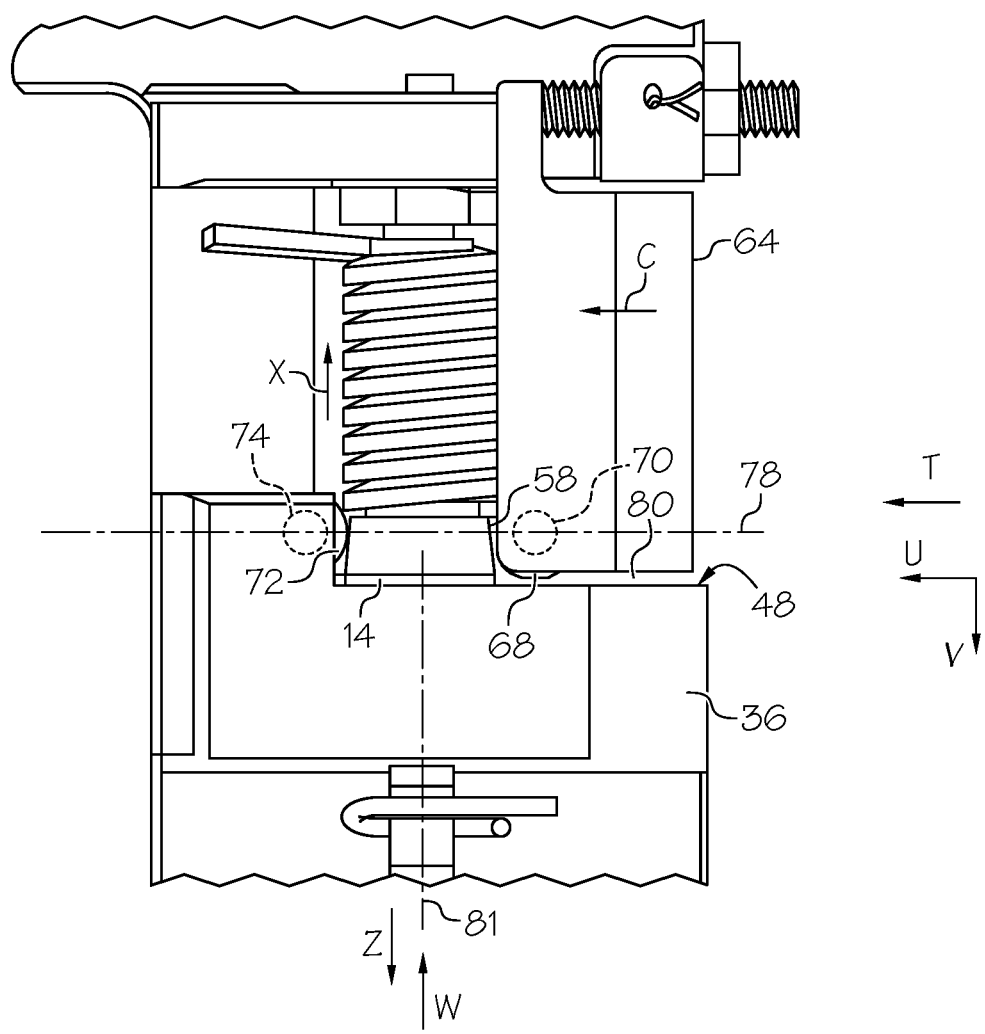
FIG. 4 is an elevational view of the door latch assembly of FIG. 1.

As best seen in reference to FIG. 4, first pin 70 and second pin 74 are co-axially aligned along a pin axis 78. This insures that both first roller 68 and second roller 72 contact taper portion 58 of latch pin 14 and not a non-tapered portion of latch pin 14. Contact with a non-tapered portion of latch pin 14 would prevent any longitudinal displacement of latch pin 14. A clearance gap 80 is maintained between catch arm member 64 and first contact face 48 of strike body 36. Clearance gap 80 provides freedom of rotation for catch arm member 64 relative to first contact face 48.

Figure 5:
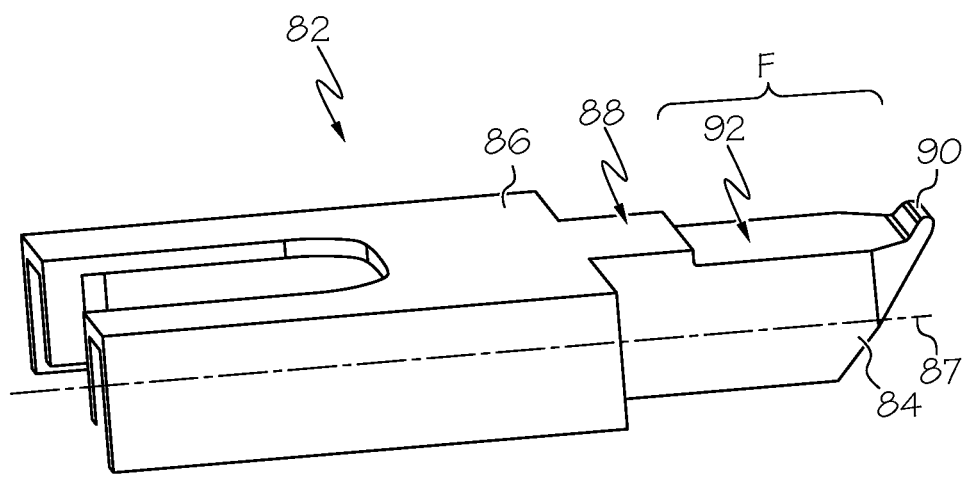
FIG. 5 is a perspective view of an embodiment of the latch bolt of FIG. 1.

Referring generally to FIGS. 5 and 6, door locking mechanism 10 further includes the latch bolt 82 positioned in an exemplary embodiment in a cockpit door 94. The latch bolt 82 includes a latch end 84 machined or otherwise created as an extension from a U-shaped body 86. U-shaped body 86 is generally disposed within the door of the aircraft and is permitted to longitudinally displace parallel to a longitudinal axis 87 of latch bolt 82. A material removal area "F" is provided between a surface 88 and a bulbous end 90 of latch bolt 82. Material of latch bolt 82 is removed or otherwise eliminated to form a recessed surface 92 within material removal area "F". Bulbous end 90 is substantially rounded in shape and is positioned at a distal end of latch bolt 82.

Referring more specifically to FIG. 6, in one exemplary embodiment of the present invention latch bolt 82 is slidably disposed within cockpit door 94 and can be displaced in an engagement direction "P" or a release direction "R". Recessed surface 92 and bulbous end 90 generally face a cockpit side of cockpit door 94 when cockpit door 94 is closed as shown. Bulbous end 90 of latch bolt 82 is positioned as shown when cockpit door 94 is in the closed position. Bulbous end 90 contacts a flattened catch face 96 of a catch end 98 of catch arm member 64. A contact point 100 is thereby created between bulbous end 90 and catch face 96. A force "S" applied to cockpit door 94 in a force application direction "G" is transferred at a door contact point 95 to latch bolt 82 and from latch bolt 82 via bulbous end 90 at contact point 100 to catch face 96. The force transferred to catch arm member 64 at contact point 100 can be varied by changing a force displacement distance "H". Force displacement distance "H" is measured from a catch arm axis 77 of first and second extensions 44, 46 (only first extension 44 is shown for clarity). When sufficient force "S" is applied to cockpit door 94 in force application direction "G" rotation of catch arm member 64 is initiated. Rotation of catch arm member 64 is in catch arm rotation arc "C". Rotation of catch arm member 64 is impeded if latch pin 14 is located as shown in FIG. 2 in the solenoid energized position. Rotation of catch arm member 64 is permitted if latch pin 14 is in the solenoid de-energized position shown in FIG. 3.

As previously discussed, and referring to FIGS. 4 and 6, if sufficient opening force "S" is applied in force application direction "G", latch pin 14 can also be displaced from the extended position shown in FIG. 2 even if solenoid 12 is energized. During this event, a total horizontal force "T" applied by catch arm member 64 to taper portion 58 is partially split into a smaller parallel force component "U" and a perpendicular force component "V". When perpendicular force component "V" is sufficient to overcome an oppositely directed energized force "W" of solenoid 12 plus a frictional force "X" between latch pin 14 and the wall of pin receiving aperture 38, (V>(W+X)) latch pin 14 is forced in a pin displacement direction "Z" (downward as viewed in FIG. 4).

Bulbous end 90 of latch bolt 82 permits a point load to be applied to catch face 96. This multiplies the force applied against catch arm member 64 as catch arm 18 rotates and force displacement distance "H" increases. Cockpit door 94 can therefore be opened using less force. By reducing the force required to open cockpit door 94, however, an unauthorized entry via cockpit door 94 could also result if sufficient force "S" is applied to cockpit door 94. For this reason, latch pin 14 is modified as discussed below.

Figure 7:
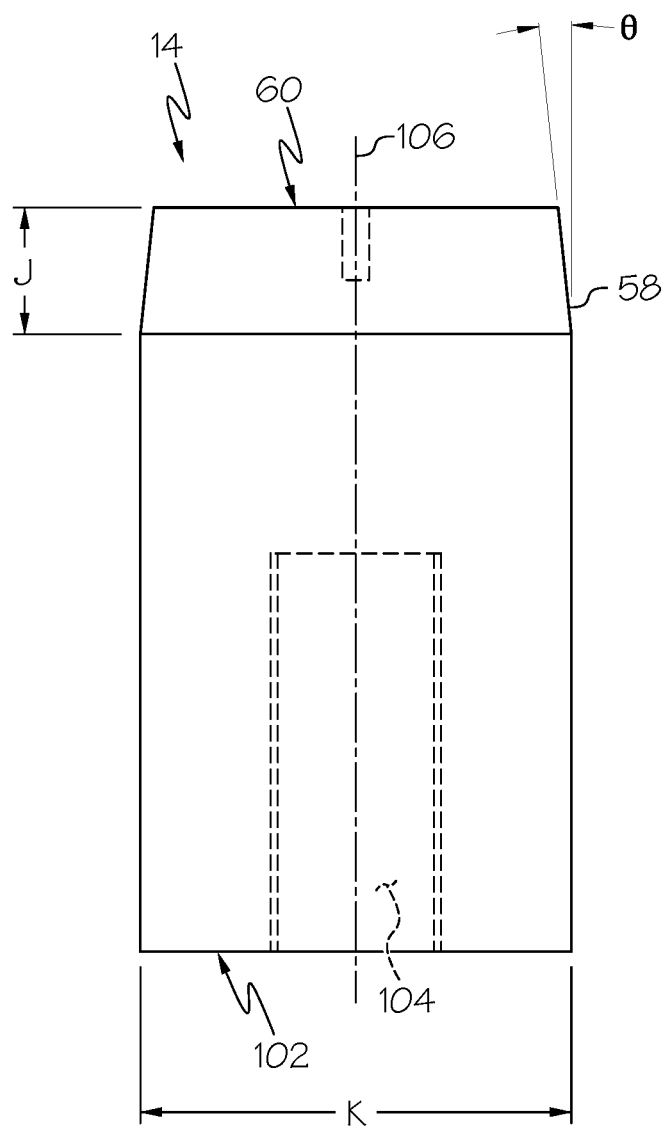
FIG. 7 is an elevational view of an embodiment of the latch pin of FIG. 2.

Referring generally to FIG. 7, latch pin 14 includes taper portion 58 which tapers outwardly from distal end 60 over a taper length "J". Taper portion 58 forms an angle θ over taper length "J". In a preferred embodiment of the present, angle θ is approximately 3.0°±0.4°. In another preferred embodiment of the present invention, angle θ can be any angle greater than 0° up to approximately 3.4°. In known applications, angle θ is approximately 4° or greater. By reducing angle θ to or below 3.4°, it has been found that a significant increase in the force required to overcome the energized position for latch pin 14 is provided. By reducing angle θ to or below 3.4°, force "S" required to open cockpit door 94 against an extended latch pin 14 is significantly increased and can exceed approximately 1500 pounds. This is sufficient to prevent an unauthorized manual opening of cockpit door 94.

As also seen in FIG. 7, latch pin 14 also includes an apertured end 102 which provides a threaded aperture 104 to threadably engage latch pin 14 with adjustment element 28. A pin diameter "K" is sized to provide a sliding or loose fit between latch pin 14 and pin receiving aperture 38 of strike body 36.

Referring again to FIG. 6, in another preferred embodiment of the present invention, a handle 108 is provided on the cockpit facing side only of cockpit door 94 and connected to latch bolt 82 to permit manual positioning in the engagement direction "P" or release direction "R" of latch bolt 82. This permits an operator within the cockpit area to manually latch or un-latch latch bolt 82 with respect to catch arm assembly 17. Latch bolt 82 can also be automatically positioned using an electronically controlled actuator (not shown).

Referring to FIG. 8 and again to FIG. 5, a latch bolt 202 is modified from latch bolt 82 by eliminating the bulbous end 90 of latch bolt 82 to create an entirely flat engagement surface 204. Latch bolt 202 also includes a sharp corner 205 at a free end of latch bolt 202, and a relief edge 206 also at a free end and connected with a tapered face 208. Engagement surface 204 is oriented parallel to a longitudinal axis 210 of latch bolt 202. The material removal area "F" of FIG.

Figure 8:
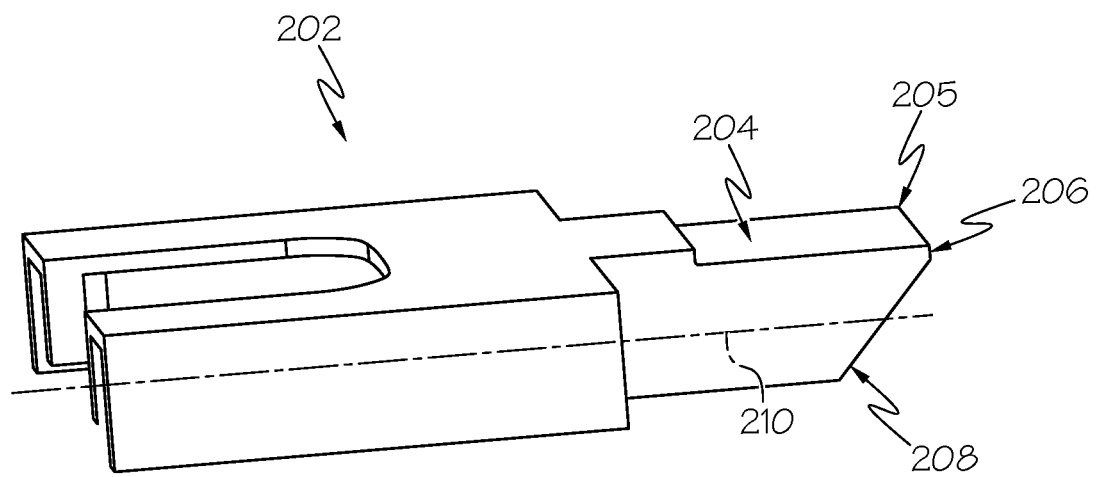
FIG. 8 is a perspective view of another embodiment of a latch bolt.

5 provided between surface 88 and bulbous end 90 of latch bolt 82 is also shown in FIG. 8, however the material removal area can also be eliminated from the embodiment of FIG. 8 because the bulbous end 90 has been eliminated from this embodiment.

Figure 9:
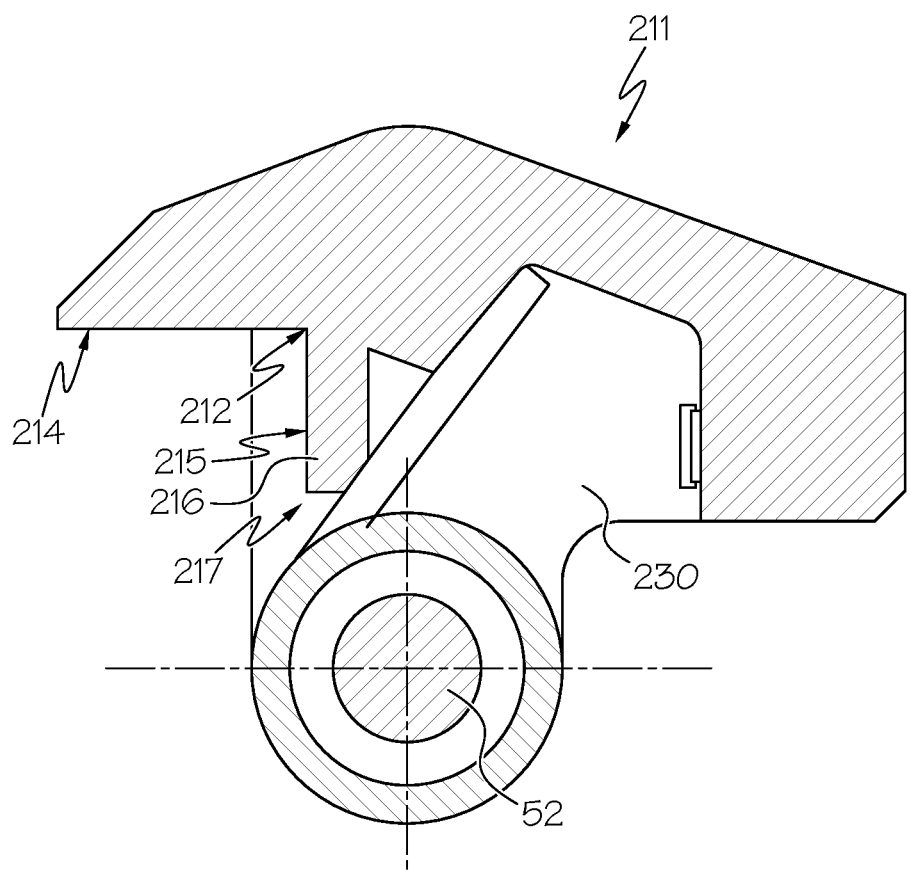
FIG. 9 is a cross sectional top plan view of another embodiment of a catch arm.

Referring to FIG. 9, a catch arm 211 has been modified from catch arms 18 and 64. Only those items different from catch arms 18 and 64 will be further described. Catch arm 211 provides a right angle inner corner 212 created at a junction of a flat face 214 and a second face 215 of a wall 216. Wall 216 is oriented 90 transverse to flat face 214. Catch arm 211, similar to catch arms 18 and 64, is rotatably supported on centering sleeve 52.

Figure 10:
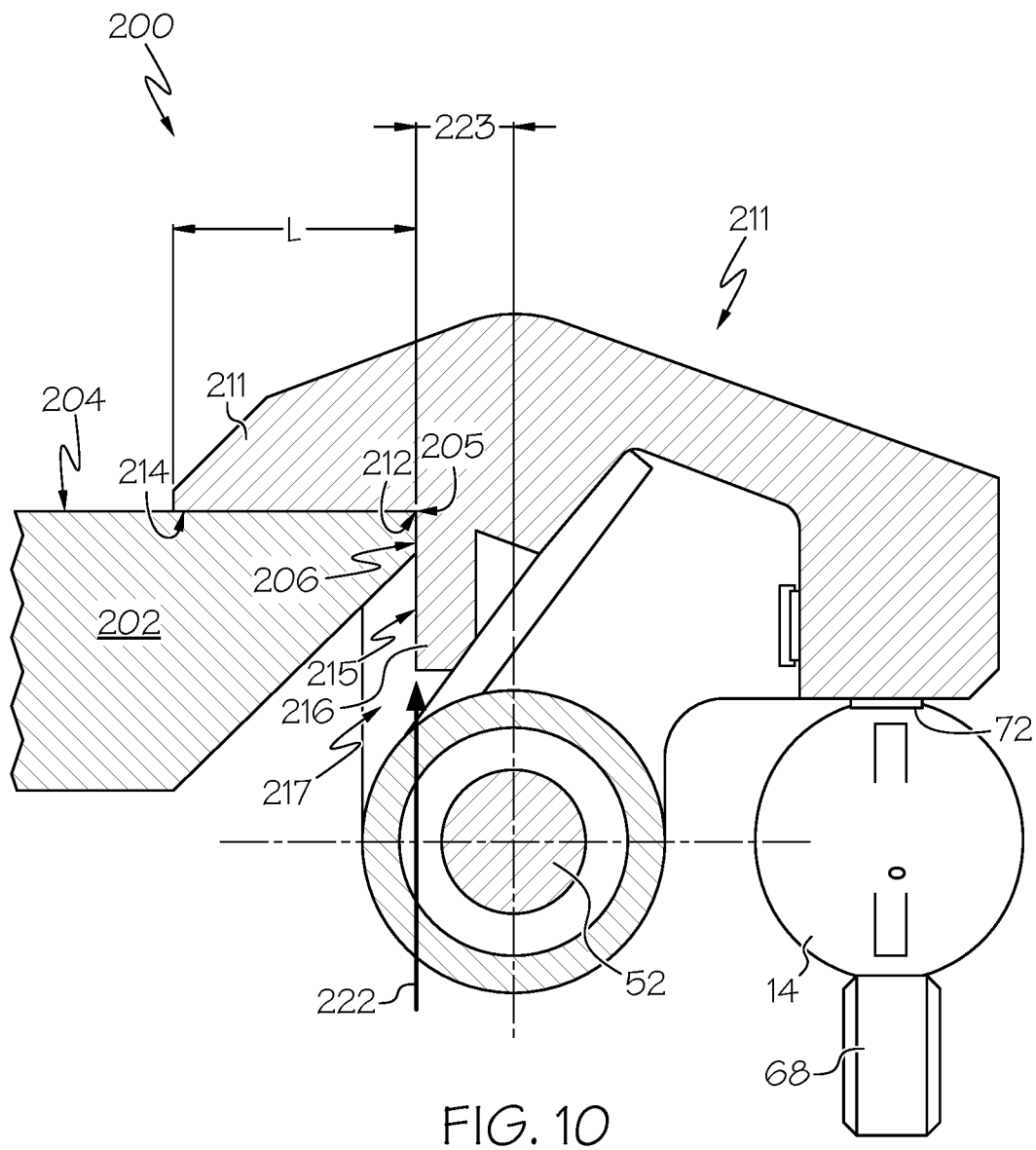
FIG. 10 is a cross sectional top plan view of a further embodiment of a door locking mechanism.

Referring now to FIG. 10, according to additional embodiments a door locking mechanism 200 includes latch bolt 202 and catch arm 211 with catch arm rotatably supported on centering sleeve 52. A door closed and latched position is shown in FIG. 10 with latch bolt 202 in an extended position and planar contact resulting between engagement surface 204 of latch bolt 202 and face 215 of catch arm 211. Contact of flat face 214 with engagement surface 204 is provided for substantially an entire length "L" of flat face 214.

When the door is in the closed position represented by FIG. 10, the latch bolt 202 is positioned with the relief edge 206 abutting wall 215 such that sharp corner 205 is engaged with the corner 212 created at the junction between face 215 of wall 216 and flat face 214. This position provides a consistent extension of latch bolt 202 which also maintains a "face-to-face" contact between flat face 214 and engagement surface 204. The face-to-face contact with abutting wall 215 prevents over-engagement of catch arm 211 by latch bolt 202 which can result in a hooked condition. In a hooked condition the sharp corner 205 would be prevented from contacting flat face 214 and components of a force applied to the door in a force direction 222 will not be entirely oriented toward an opening direction of catch arm 211. The hooked condition can therefore create an elevated spike in the opening force required to force catch arm 211 to rotate back to the desired face-to-face contact position with engagement surface 204 before further rotating to clear catch arm 211. A spacing 223 from the center of centering sleeve 52 to face 215 and corner 212 in the door closed and latched position can be varied by the manufacturer to vary the moment arm and therefore the resistance to rotation of catch arm 211.

Figure 11:
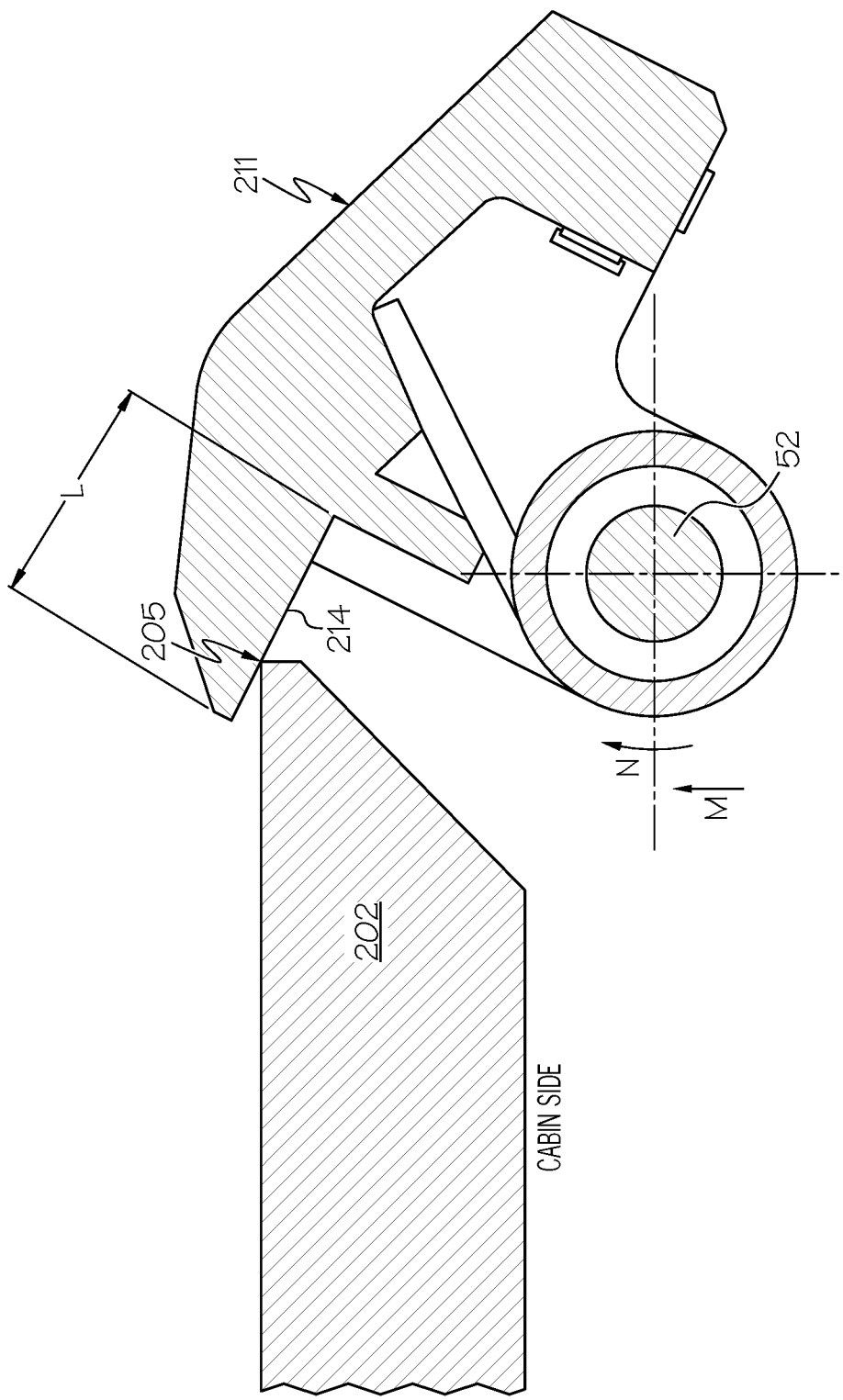
FIG. 11 is a cross sectional top plan view of the door locking mechanism of FIG. 10 in a rotated position of the catch arm.

Referring to FIG. 11, as an opening force "M" is applied from the cabin side, displacement of latch bolt 202 causes catch arm 211 to rotate in a clockwise direction "N" about centering sleeve 52 until flat face 214 rotates away from planar contact with engagement surface 204. This rotation creates a point load at the contact point between sharp corner 205 and flat face 214 which has a component of opening force always directed to rotate catch arm 211. This point load is thereafter evenly applied as sharp corner 206 slides along flat face 214 for length "L" as catch arm 211 continues to rotate.

According to an embodiment of the present invention, a door latch assembly for aircraft cabin door is provided with an alternate construction of the latch pin 14. The latch pin 14 comprises a material having a hardness of 60 Rockwell C or more, the first roller 68 comprises a material having a hardness of 33 Rockwell C or less, and the second roller 72 comprises a material having a hardness of 60 Rockwell C or more. Thus, the first roller 68 is made of a material having a hardness that is considerably lower than a hardness of the latch pin 14 and the second roller 72.

The Rockwell C scale is a hardness scale based on indentation hardness of a material. The Rockwell C scale is commonly used for hard steels. The Rockwell C test determines hardness by measuring the depth of penetration of an indenter under a large load compared to the penetration made by a preload. The standard for determining the Rockwell C hardness according to the present invention is defined in ASTM E18.

The latch pin 14 and second roller 72 are made of a material having a hardness of 60 Rockwell C or more. However, the first roller 68 is made of a material having a hardness of 33 Rockwell C or less, which is notably less than the hardness of the material of the latch pin 14 This is counter-intuitive because if a first roller 68 was made of a material having a hardness more similar to the latch pin 14 it would have reduced wear and an increased useful life, yet according to the present invention, the first roller 68 is made of a material with considerably lower hardness than the latch pin 14 and the second roller 72. This lower hardness of the first roller 68 provides a new function of the door latch with the following advantages.

First, in a situation where a latch pin 14, a first roller 68, and second roller 72 are made of materials having similar hardness, a force that is transmitted through the first roller 68 against the latch pin 14 during movement of the catch arm 18 can cause deformation of the latch pin 14, and substantial deformation of the latch pin 14 can permit the first roller 68 to slide and/or roll past the deformed latch pin 14, thereby allowing rotation of the catch arm 18 and permitting unauthorized opening of the cockpit door. Thus, even when a deformed latch pin 14 is energized by the solenoid 12 to be in an extended position, at which position the latch pin 14 was originally intended to impede rotation of the catch arm 18, the deformed latch pin 14 may ineffectively impede rotation and permit unauthorized entry into a flight cabin.

In comparison, when the latch pin 14 and second roller 72 are made of a material having a hardness of 60 Rockwell C or more and a first roller 68 is made of a material having a hardness of 33 Rockwell C or less, the first roller 68 is configured to deform when subjected to the applied force that urges the first roller 68 into engagement with the latch pin 14, such that substantial deformation of the latch pin 14 is inhibited to an extent that the first roller 68 could potentially slip past the latch pin 14. Also, when the second roller 72 is made of a material having a hardness of 60 Rockwell C or more, the first roller 68 is configured to deform before the second roller 72 so that the second roller 72 maintains its original position supporting a second side of the latch pin 14 when a first side is engaged by the first roller 68. Accordingly, the latch pin 14 and second roller 72 having a hardness of 60 Rockwell C or more and a first roller 68 having a hardness of 33 Rockwell C or less provides increased security in operation of a door latch assembly for a cockpit door by inhibiting deformation of a latch pin 14.

Second, because the latch pin 14 and first roller 68 are made of a material having a hardness of 60 Rockwell C or more and a first roller 68 is made of a material having a considerably lower hardness of 33 Rockwell C or less, the first roller 68 is configured to deform through engagement of the first roller 68 against the latch pin 14. Thus, under an intrusion impact resulting in a great force between the first roller 68 and the latch pin 14, the first roller 68 significantly deforms towards a more ovular shape and thus resists rolling movement of the first roller 68 to inhibit rolling of the first roller 68 over the latch pin 14. By doing this the deformed first roller 68 improves the door latch assembly's capability to withstand intrusion events. Accordingly, the latch pin 14 and second roller 72 having a hardness of 60 Rockwell C or more and a first roller 68 having a hardness of 33 Rockwell C or less provides increased security in operation of a door latch assembly for a cockpit door.

In an aspect, the material of the latch pin 14, the first roller 68, and the second roller 72 includes a metal, such as stainless steel.

In an aspect, a hardness of each component may be determined by a selection of a different composition for each component and/or by a differing processing (e.g. heat treatment) for each component. In an example, the latch pin 14 and second roller 72 may be formed from 440C stainless steel heat treated to a hardness of 60 Rockwell C or more, and the first roller 68 may be formed from 15-5 stainless steel heat treated to a hardness of 33 Rockwell C or less.

In an aspect, the specified hardness of latch pin 14, first roller 68, and second roller 72 is a surface hardness. In another aspect, the latch pin 14, first roller 68, and second roller 72 have the specified hardness throughout a structure thereof.

In an aspect, the first roller 68 is made a metal that is heat treated to have a strength of 145 ksi or less. By selecting the first roller 68 from a metal having a strength of 145 ksi or less, the first roller 68 is configured to deform upon application of an impact force that is transmitted through the first roller 68 against the latch pin 14 prior to deformation of the latch pin 14.

According to an embodiment of the present invention, a method of using a door latch assembly includes providing the door latch assembly according to one or more features described above, moving the latch pin from the retracted position to the extended position, and rotating the catch arm assembly such that the first roller engages a first side of the extended latch pin, wherein the extended latch pin impedes the rotational movement of the catch arm assembly.

In an aspect, during the method of using the door latch assembly the first roller may be deformed upon engagement of the first roller against the latch pin.

In an aspect, the deformed first roller may be configured to be readily replaceable with a replacement first roller. In an exemplary embodiment, the first roller 68 is mounted to the catch arm member 64 using a first pin 70 that is removable such that the first roller 68 is configured to be replaceably installed to permit replacement of a deformed first roller 68, whereby the first roller 68 is sacrificial since it is configured to deform when subjected to the applied force that urges the first roller 68 into engagement with the latch pin 14 and to thereafter be replaced. Thus, according to an aspect, the method of using a door latch assembly further includes replacing the deformed first roller with a replacement first roller, the replacement first roller including a material having a hardness of 33 Rockwell C or less. In an aspect, the replacement first roller may include a metal having a hardness of 33 Rockwell C or less. In another aspect, the replacement first roller may include a stainless steel that is heat treated to have a hardness of 33 Rockwell C or less. In yet another aspect, the replacement first roller may include a 15-5 stainless steel that is heat treated to have a hardness of 33 Rockwell C or less.

Figure 14:
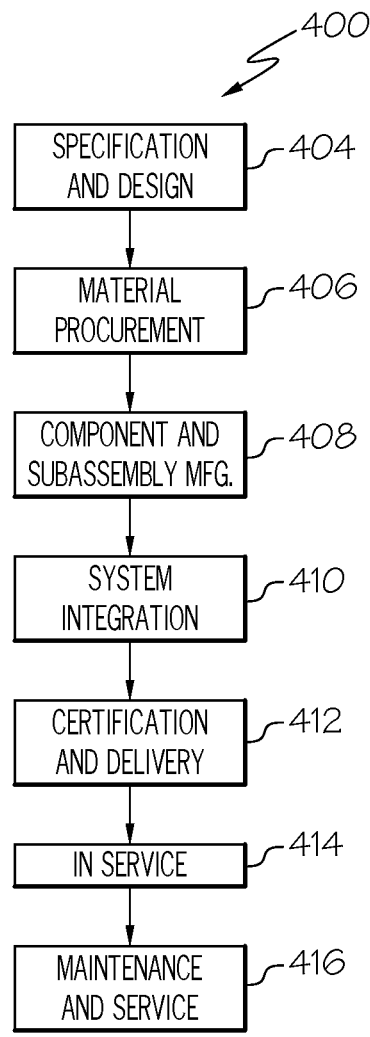
FIG. 14 is a flow diagram of an aircraft manufacturing and service methodology.
Figure 15:
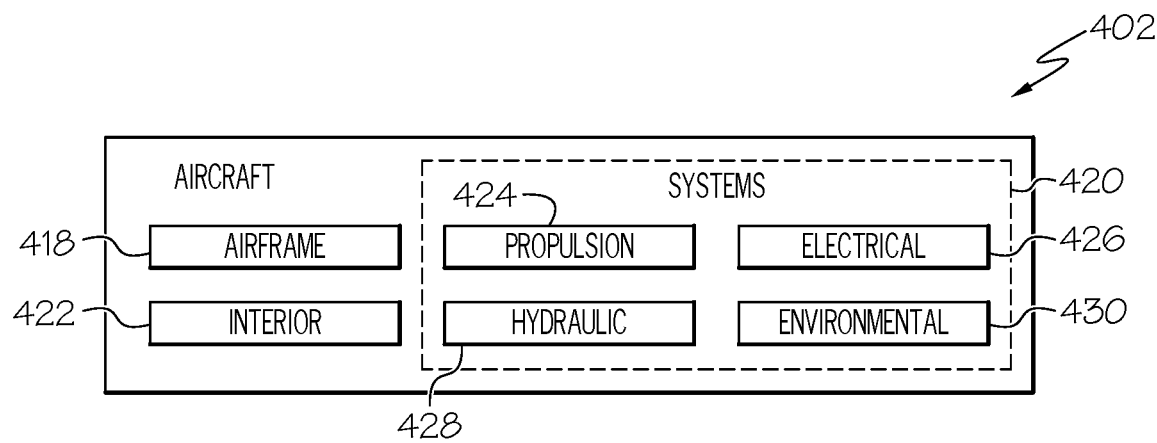
FIG. 15 is a block diagram of an aircraft.

Examples of the disclosed door latch assembly may be described in the context of an aircraft manufacturing and service method 400, as shown in FIG. 14, and an aircraft 402, as shown in FIG. 15. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. The disclosed door latch assembly may be incorporated into various systems 420 of the aircraft 402.

The disclosed door latch assembly may be employed during any one or more of the stages of the aircraft manufacturing and service method 400. For example, components or subassemblies corresponding to component/subassembly manufacturing 408, system integration 410, and or maintenance and service 416 may be fabricated or manufactured using the disclosed door latch assembly. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed door latch assembly are described in the context of an aircraft; however, one of ordinary skill in the art will readily recognize that the disclosed service system may be utilized for a variety of different types of vehicles and non-vehicles. As one example, implementations of the embodiments described herein may be implemented in any type of vehicle including, e.g., helicopters, passenger ships, automobiles and the like.

Although various embodiments of the disclosed door latch assembly have been shown and described, modifications may occur to those skilled in the art upon reading the specification. The present application includes such modifications and is limited only by the scope of the claims.

What is claimed is:

1. A subassembly for a door latch, the subassembly comprising:
   a catch support assembly, the catch support assembly including a strike body having a pin receiving aperture therein;
   a catch arm assembly rotatably mounted to the catch support assembly;
   a latch pin positioned in the pin receiving aperture, and wherein the latch pin is movable relative to the strike body between a retracted position and an extended position, the latch pin protruding above the strike body in the extended position to impede rotational movement of the catch arm assembly;

a first roller rotatably mounted to the catch arm assembly and configured to apply a force to a first site of the latch pin in the extended position to impede rotation of the catch arm assembly; and a second roller rotatably mounted to the catch support assembly and configured to engage a second side of the latch pin in the extended position to apply an opposing force to the second side of the latch pin, wherein the latch pin comprises a material having a hardness of 60 Rockwell C or more, wherein the first roller comprises a material having a hardness of 33 Rockwell C or less, and wherein the second roller comprises a material having a hardness of 60 Rockwell C or more;

wherein a configuration of the latch pin, the first roller, and the second roller, along with the hardness of each of the latch pin, the first roller, and the second roller, is characterized to prevent deformation of the latch pin over time during operational use of the subassembly.

2. The subassembly of claim 1 wherein the latch pin comprises a metal having a hardness of 60 Rockwell C or more.

3. The subassembly of claim 1 wherein the latch pin comprises a stainless steel that is heat treated to have a hardness of 60 Rockwell C or more.

4. The subassembly of claim 1 wherein the latch pin comprises a 440C stainless steel that is heat treated to have a hardness of 60 Rockwell C or more.

5. The subassembly of claim 1 wherein the first roller comprises a metal having a hardness of 33 Rockwell C or less.

6. The subassembly of claim 1 wherein the first roller comprises a stainless steel that is heat treated to have a hardness of 33 Rockwell C or less.

7. The subassembly of claim 1 wherein the first roller comprises a 15-5 stainless steel that is heat treated to have a hardness of 33 Rockwell C or less.

8. The subassembly of claim 1 wherein the first roller comprises a metal that is heat treated to have a strength of 145 ksi or less.

9. The subassembly of claim 1 wherein the second roller comprises a material having a hardness of 60 Rockwell C or more.

10. The subassembly of claim 1 wherein the second roller comprises a metal having a hardness of 60 Rockwell C or more.

11. The subassembly of claim 1 wherein the second roller comprises a stainless steel that is heat treated to have a hardness of 60 Rockwell C or more.

12. The subassembly of claim 1 wherein the latch pin comprises a metal having a hardness of 60 Rockwell C or more, wherein the first roller comprises a metal having a hardness of 33 Rockwell C or less, and wherein the second roller comprises a metal having a hardness of 60 Rockwell C or more.

13. The subassembly of claim 1 wherein the first roller having a hardness of 33 Rockwell C or less is configured to deform when subjected to the applied force that urges the first roller into engagement with the latch pin, such that substantial deformation of the latch pin is inhibited to an extent that the first roller could potentially move past the latch pin.

14. The subassembly of claim 1 wherein the first roller 68 is mounted to the catch arm assembly such that the first roller is configured to be replaceably installed to permit replacement of a deformed first roller, whereby the first roller is sacrificial since it is configured to deform when subjected to the applied force that urges the first roller into engagement with the latch pin and to thereafter be replaced.

15. A method of using a subassembly for a door latch, the method comprising:

providing the subassembly of claim 1;

moving the latch pin from the retracted position to the extended position; and rotating the catch arm assembly such that the first roller engages the first side of the extended latch pin and the second roller engages the second side of the extended latch pin, wherein the extended latch pin impedes the rotational movement of the catch arm assembly.

16. The method of claim 15 further comprising deforming the first roller upon engagement of the first roller against the extended latch pin.

17. The method of claim 16 further comprising replacing the deformed first roller with a replacement first roller, the replacement first roller comprising a material having a hardness of 33 Rockwell C or less.

18. The method of claim 17 wherein the replacement first roller comprises a metal having a hardness of 33 Rockwell C or less.

19. The method of claim 17 wherein the replacement first roller comprises a stainless steel that is heat treated to have a hardness of 33 Rockwell C or less.

20. The method of claim 17 wherein the replacement first roller comprises a 15-5 stainless steel that is heat treated to have a hardness of 33 Rockwell C or less.

* * * * *